United States Patent
Dai et al.

(10) Patent No.: US 11,852,457 B2
(45) Date of Patent: Dec. 26, 2023

(54) CONTACTLESS METHOD FOR POLYMER COATING THICKNESS MEASUREMENT

(71) Applicant: GM GLOBAL TECHNOLOGY OPERATIONS LLC, Detroit, MI (US)

(72) Inventors: Fang Dai, Troy, MI (US); Hongliang Wang, Sparks, NV (US); Shuru Chen, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 17/556,430

(22) Filed: Dec. 20, 2021

(65) Prior Publication Data

US 2023/0194242 A1   Jun. 22, 2023

(51) Int. Cl.
| | |
|---|---|
| *G01B 11/06* | (2006.01) |
| *H01M 4/02* | (2006.01) |
| *H01M 4/62* | (2006.01) |
| *H01M 10/052* | (2010.01) |
| *H01M 4/38* | (2006.01) |

(52) U.S. Cl.
CPC ......... *G01B 11/0641* (2013.01); *H01M 4/382* (2013.01); *H01M 4/62* (2013.01); *H01M 10/052* (2013.01); *H01M 2004/027* (2013.01); *H01M 2220/20* (2013.01)

(58) Field of Classification Search
CPC ..... G01B 11/0641; H01M 4/382; H01M 4/62; H01M 10/052; H01M 2004/027; H01M 2220/20

USPC .......................................................... 356/630
See application file for complete search history.

(56) References Cited

U.S. PATENT DOCUMENTS

| | | | | |
|---|---|---|---|---|
| 2008/0174784 | A1* | 7/2008 | Colonna De Lega | G01B 9/02088 356/511 |
| 2011/0168952 | A1* | 7/2011 | Hsu | C08L 65/00 252/500 |
| 2013/0216915 | A1* | 8/2013 | Affinito | H01M 4/366 429/231.95 |
| 2015/0292866 | A1* | 10/2015 | Sasaki | G01B 11/0641 356/369 |
| 2019/0296406 | A1* | 9/2019 | Campbell | H01M 4/133 |

* cited by examiner

*Primary Examiner* — Michael A Lyons
*Assistant Examiner* — Omar H Nixon

(57) ABSTRACT

A system for measuring a thickness of a coating arranged on an anode substrate includes an optical measurement system configured to transmit a light signal having a known first polarization toward the anode substrate through the coating such that the light signal is reflected from the surface of the anode substrate, a detection module positioned to receive the reflected light signal and configured to determine a second polarization of the reflected light signal that is different from the first polarization and measure a polarization difference between the first polarization and the second polarization, and a measurement module configured to receive the measured polarization difference, calculate the thickness of the coating based on the measured polarization difference, and generate an output based on the calculated thickness.

16 Claims, 2 Drawing Sheets

CONTACTLESS METHOD FOR POLYMER COATING THICKNESS MEASUREMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for determining a thickness of a polymer coating on a flexible metal substrate.

Flexible substrates may be used in various electronic and other applications, such as flexible circuit boards, displays, solar panels, etc. In one example, a battery (e.g., a battery for hybrid and/or electric vehicles) includes one or more components implemented as flexible substrates. For example, the battery may include electrodes (e.g., an anode and a cathode) comprised of a flexible metal substrate. A separator comprised of a flexible polymer substrate is arranged between the electrodes.

SUMMARY

A system for measuring a thickness of a coating arranged on an anode substrate includes an optical measurement system configured to transmit a light signal having a known first polarization toward the anode substrate through the coating such that the light signal is reflected from the surface of the anode substrate, a detection module positioned to receive the reflected light signal and configured to determine a second polarization of the reflected light signal that is different from the first polarization and measure a polarization difference between the first polarization and the second polarization, and a measurement module configured to receive the measured polarization difference, calculate the thickness of the coating based on the measured polarization difference, and generate an output based on the calculated thickness.

In other features, the system includes a display configured to receive the output from the measurement module and display the calculated thickness.

In other features, the measurement module includes a thickness calculation module configured to calculate the thickness based on data correlating measured polarizations differences to respective thicknesses.

In other features, the thickness calculation module is configured to execute a model that outputs the calculated thickness based on the measured polarization difference.

In other features, the data includes a lookup table.

In other features, the data includes a plurality of data points each correlating an actual measured thickness to measured ellipsometry data.

In other features, the measured ellipsometry data includes at least one of a reflection ratio p, an amplitude ratio $\Psi$, and a phase shift $\Delta$.

In other features, the anode substrate is a lithium-metal substrate.

In other features, the coating is a polymer coating.

In other features, the polymer coating is at least partially transparent to light.

A method for measuring a thickness of a coating arranged on an anode substrate includes positioning the anode substrate in an optical measurement system, transmitting a light signal having a known first polarization from a light source of the optical measurement system toward the anode substrate through the coating such that the light signal is reflected from the surface of the anode substrate, receiving the reflected light signal at a detection module positioned to receive the reflected light signal, and, using the detection module, determining a second polarization of the reflected light signal that is different from the first polarization and measuring a polarization difference between the first polarization and the second polarization. The method further includes, using a measurement module, calculating the thickness of the coating based on the measured polarization difference and generating an output based on the calculated thickness.

In other features, the method further includes displaying the calculated thickness using a display.

In other features, the method further includes calculating the thickness based on data correlating measured polarizations differences to respective thicknesses.

In other features, the method further includes executing a model that outputs the calculated thickness based on the measured polarization difference.

In other features, the data includes a lookup table.

In other features, the data includes a plurality of data points each correlating an actual measured thickness to measured ellipsometry data.

In other features, the measured ellipsometry data includes at least one of a reflection ratio p, an amplitude ratio $\Psi$, and a phase shift $\Delta$.

In other features, the anode substrate is a lithium-metal substrate.

In other features, the coating is a polymer coating.

In other features, the polymer coating is at least partially transparent to light.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Hybrid electric and electric vehicles typically include one or more rechargeable batteries each including a plurality of battery cells. Types of rechargeable batteries include, but are not limited to, lithium ion, lithium-sulfur (Li—S), lithium metal, and/or other types of rechargeable batteries.

Battery components may include various coatings to reduce material leakage, improve conductivity, resist corrosion, etc. For example, battery electrodes may comprise flexible metal substrates (e.g., flexible lithium metal anodes) with a thin polymer coating. A thickness of the coating affects performance of the anode. For example, a uniform thickness facilitates uniform ion distribution on the anode. Measuring the thickness of the coating may be difficult. For example, measurements with instruments that use direct physical contact (e.g., micrometers) may damage the coating or substrate, while measurements using x-rays are inaccurate if the coating is not in a crystalline phase.

Systems and methods according to the present disclosure are configured to measure a thickness of a polymer coating on a flexible substrate, such as a flexible lithium metal anode of a rechargeable battery. The thickness is measured using a contactless method to avoid contamination and physical damage to sensitive coatings and substrates. For example, a light source directs a light signal (e.g., a laser) at the substrate through the coating. The light signal is reflected from the substrate and received at a detector. The detector (e.g., an ellipsometry detector) is configured to determine a thickness of the coating based on characteristics of the reflected signal.

Although described herein with respect to lithium metal anodes for vehicle batteries (e.g., rechargeable batteries for electric or hybrid vehicles), the principles of the present disclosure may be applied to flexible metal substrates used in non-battery and non-vehicle applications.

Figure 1:
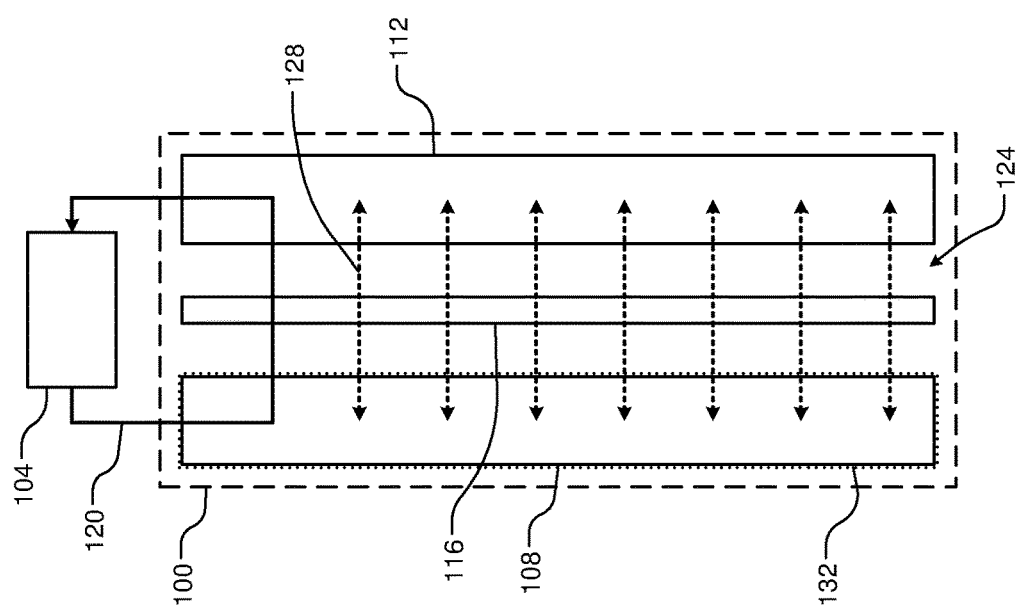
FIG. 1 is an example battery cell.

An example battery (e.g., a battery cell) 100 for powering a load 104 is shown in FIG. 1. For example, the battery 100 corresponds to a lithium ion, Li—S, or lithium metal battery for a vehicle. The battery 100 includes an anode 108, a cathode 112, and a separator 116 arranged between the anode 108 and the cathode 112. For example, the separator 116 is comprised of a flexible, permeable membrane. When powering the load 104 (i.e., discharging), current flows from the cathode 112 to the anode 108 and through the load 104 in a direction indicated by arrow 120. Conversely, when charging (e.g., using a motor or other charging source), current flows from a charging source through the anode 108 and into the cathode 112 in a direction opposite the arrow 120.

An electrolyte material 124 contained within the battery 100 surrounds the anode 108 and the cathode 112. The separator 116 electrically isolates the anode 108 and the cathode 112 from each other while allowing charged ions of the electrolyte material 124 to flow through the separator 116 as shown by arrows 128. In some examples, the anode 108 and/or the cathode 112 may include a coating, such as a thin polymer coating 132 shown arranged on surfaces of the anode 108. Systems and methods according to the present disclosure measure a thickness of the coating 132 without contacting the coating 132 or a flexible metal substrate of the anode 108.

Figure 2:
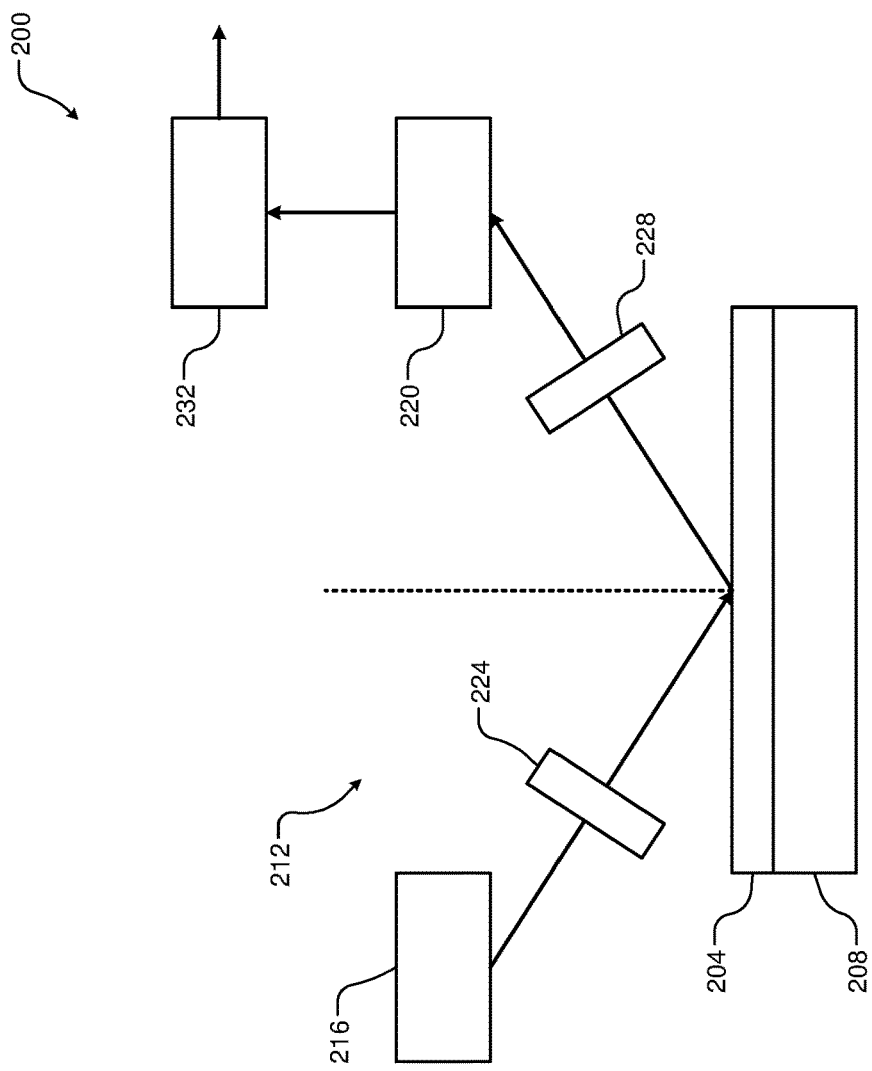
FIG. 2 is an example system configured to determine a thickness of a coating on an anode substrate according to the present disclosure.

Referring now to FIG. 2, an example system 200 according to the present disclosure is configured to determine a thickness of a coating (e.g., a polymer coating) 204 on a flexible metal substrate (e.g., an anode substrate 208, such as a lithium metal anode). An optical measurement system 212 includes a light source 216 and a detection module 220. For example, the optical measurement system 212 is an ellipsometry system.

The light source 216 is arranged to direct a light signal (e.g., a laser) at the anode substrate 208 through the coating 204. The coating 204 is at least partially transparent to light such that the light signal passes through the coating 204, reflects off of the anode substrate 208, and is redirected toward the detection module 220. The detection module 220 is configured to measure a change in polarization of the light signal (i.e., a change caused by interacting with the coating 204 and the substrate 208).

For example, the unpolarized light signal passes through a first polarizer 224 configured to linearly polarize the light signal with respect to a known angle relative to a plane of the coating 204. Accordingly, the light signal has a known polarization prior to passing through the coating 204. The light signal reflected from the substrate 208 is elliptically polarized and passes through a second polarizer 228 arranged between the substrate 208 and the detection module 220. For example, the second polarizer 228 is configured to rotate. In some examples, the second polarizer 228 rotates continuously during measurements. Accordingly, an amount of the reflected light signal permitted to pass through to the detection module 220 corresponds to an orientation of the second polarizer 228 relative to an electric field of the reflected light signal.

The detection module 220 measures the polarization of the reflected light signal (a reflected signal polarization) and compares the reflected signal polarization to the known polarization of the light signal as output from the first polarizer 224. A polarization difference between the reflected signal polarization and the known polarization may be expressed as $\rho = \tan(\Psi)e^{i\Delta}$, where p is a complex reflection ratio, $\Psi$ is an amplitude ratio of the reflected light signal, $\Delta$ is a phase shift between the light signal and the reflected light signal. An output of the detection module 220 indicates the measured polarization difference. A measurement module 232 receives measured polarization difference from the detection module 220 and determines a thickness of the coating 204 accordingly as described below in more detail.

Figure 3:
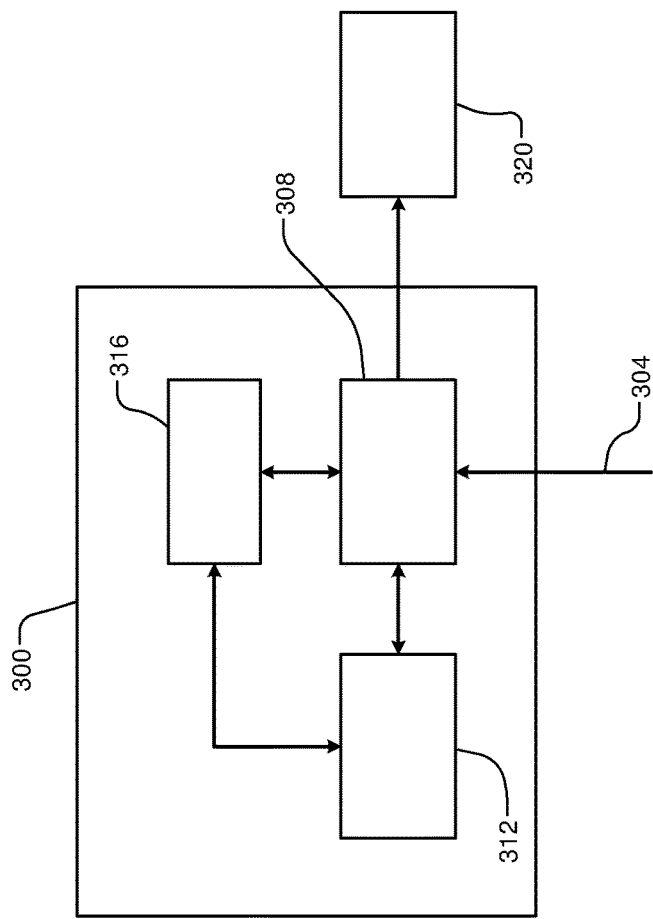
FIG. 3 is an example measurement module of the system of FIG. 2.

Referring now to FIG. 3, a measurement module 300 (e.g., corresponding to the measurement module 232 of FIG. 2) is configured to determine a thickness of the coating 204 based on a polarization difference 304 received from the detection module 220. For example, the measurement module 300 includes a thickness calculation module 308, a data correlation module 312, and memory (e.g., non-volatile memory) 316. The thickness calculation module 308 is configured to determine the thickness of the coating 204 based on the polarization difference 304 and data correlating polarization differences to a thickness of a material (i.e., the material of the coating 204).

For example, the thickness calculation module 308 may be configured to execute a model or algorithm (e.g., as selected from one or more models, lookup tables, etc. stored in the data correlation module 312) using inputs including, but not limited to, the polarization difference 304 and additional data corresponding to other variables that affect the thickness calculation. The additional data may include, but is not limited to, an identifier of the material of the coating 204, and system parameters (e.g., laser power levels, angle of incidence, the known polarization of the light signal, temperature, etc.). The additional data may be stored in the memory 316.

The models stored in the data correlation module 312 may be configured in accordance with calibration and/or measurement data correlating measured polarization differences for a given material with measured thicknesses. In one example, polarization differences may be measured (i.e., using the system 200 of claim 2) for a plurality of different coatings arranged on a same substrate. Respective thicknesses of each of the coatings may be measured prior to or subsequent to measuring the polarization differences. Accordingly, the calibration data may include a plurality of data points each correlating an actual measured thickness to measured ellipsometry data such as the reflection ratio p, the amplitude ratio Ψ, the phase shift Δ, etc.

In this manner, one or more models can be constructed to output a thickness of a coating based on the polarization difference 304 and the calibration data. For example, the model may be constructed to match the polarization difference 304 measured for a coating to a curve corresponding to an actual thickness of the coating. The model may be configured to simply correlate the polarization difference 304 to thickness and/or may be further configured to calculate the thickness based on additional variables such as coating material, substrate material, system parameters, etc. In some examples, the calculated thickness may be output for display (e.g., on a display 320).

Figure 4:
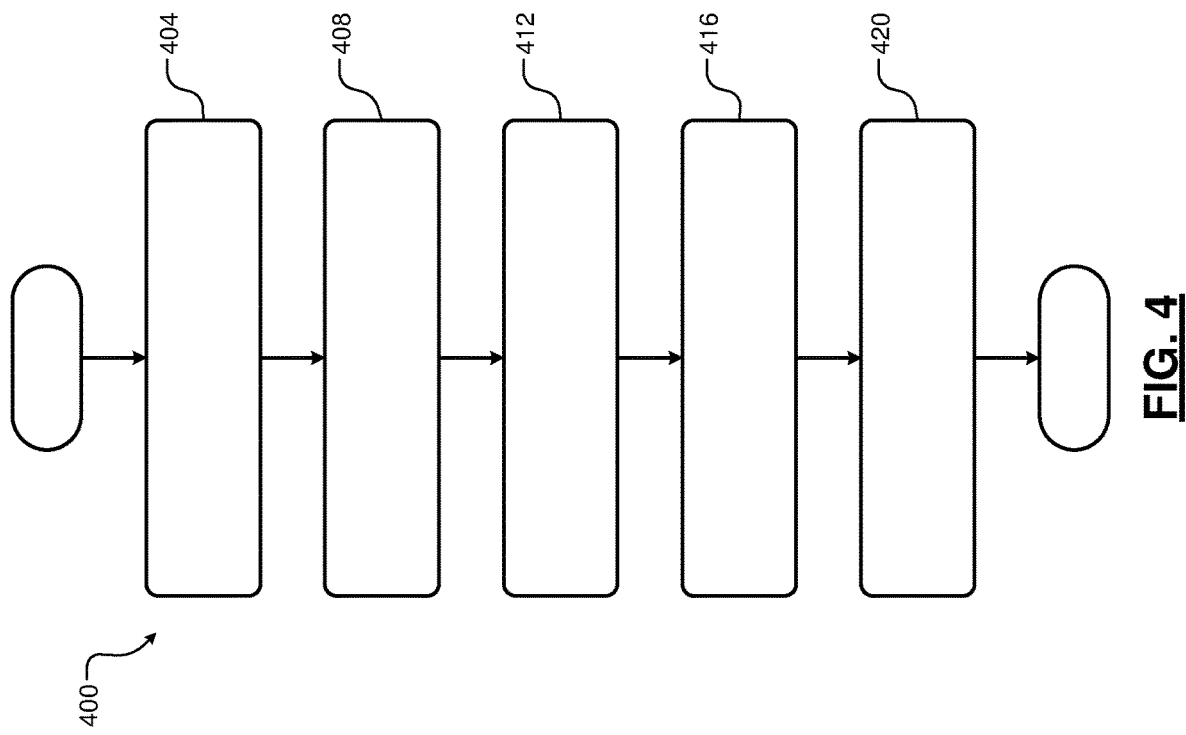
FIG. 4 illustrate steps of an example method for measuring a thickness of a coating on an anode substrate according to the present disclosure.

Referring now to FIG. 4, an example method 400 for measuring a thickness of a coating (e.g., the coating 204) on an anode substrate (e.g., the anode substrate 208) according to the present disclosure is shown. At 404, calibration and/or measurement data correlating ellipsometry measurements to coating thickness is obtained. For example, as described above with respect to FIG. 3, polarization differences may be measured for a plurality of different coatings. The calibration data may include a plurality of different coating types, substrate types, etc. Accordingly, the calibration data includes a plurality of data points each correlating an actual measured thickness for a particular coating type and substrate type to measured ellipsometry data such as the reflection ratio p, the amplitude ratio ip is an amplitude ratio, the phase shift Δ, etc.

At 408, one or more models are generated. The models are configured to output a calculated thickness of a coating based on the stored calibration data and one or inputs including, but not limited to, ellipsometry measurements of the coating, a material of the coating, a material of the substrate, and various system parameters.

At 412, a sample including an anode substrate and a coating is arranged in an optical measurement system, such as an ellipsometry measurement system. At 416, an ellipsometry measurement is performed on the coating. For example, as described above with respect to FIG. 2, a polarized light signal is directed at the coating, reflected from the substrate, and received by a detection module (e.g., the detection module 220). The detection module measures the polarization of the reflected light signal, compares the measured polarization to a known polarization of the light signal, and to generates an output that indicates a measured polarization difference.

At 420, the method 400 (e.g., the measurement module 232/300) calculates and outputs a thickness of the coating (e.g., for display) based on the measured polarization difference. For example, the method 400 retrieves and executes a model configured to receive the measured polarization difference as an input and calculated the thickness of the coating in accordance with calibration data that correlates polarization differences to respective thicknesses for a given material.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for measuring a thickness of a coating arranged on an anode substrate, the system comprising:
an optical measurement system configured to transmit a light signal toward the anode substrate through the coating such that the light signal is reflected from the surface of the anode substrate,
wherein the light signal has a known first polarization, and wherein the anode substrate is a flexible lithium metal anode and the coating is a polymer coating;
a detection module positioned to receive the reflected light signal and configured to (i) determine a second polarization of the reflected light signal, wherein the second polarization is different from the first polarization and (ii) measure a polarization difference between the first polarization and the second polarization; and
a measurement module configured to receive the measured polarization difference, calculate the thickness of the coating based on the measured polarization difference, and generate an output based on the calculated thickness.

2. The system of claim 1, further comprising a display configured to receive the output from the measurement module and display the calculated thickness.

3. The system of claim 1, wherein the measurement module includes a thickness calculation module configured to calculate the thickness based on data correlating measured polarizations differences to respective thicknesses.

4. The system of claim 3, wherein the thickness calculation module is configured to execute a model that outputs the calculated thickness based on the measured polarization difference.

5. The system of claim 3, wherein the data includes a lookup table.

6. The system of claim 3, wherein the data includes a plurality of data points each correlating an actual measured thickness to measured ellipsometry data.

7. The system of claim 6, wherein the measured ellipsometry data includes at least one of a reflection ratio p, an amplitude ratio $\Psi$, and a phase shift $\Delta$.

8. The system claim 1, wherein the polymer coating is at least partially transparent to light.

9. A method for measuring a thickness of a coating arranged on an anode substrate, the method comprising:
positioning the anode substrate in an optical measurement system,
wherein the anode substrate is a flexible lithium metal anode and the coating is a polymer coating;
transmitting a light signal from a light source of the optical measurement system toward the anode substrate through the coating such that the light signal is reflected from the surface of the anode substrate, wherein the light signal has a known first polarization;
receiving the reflected light signal at a detection module positioned to receive the reflected light signal;
using the detection module,
determining a second polarization of the reflected light signal, wherein the second polarization is different from the first polarization, and
measuring a polarization difference between the first polarization and the second polarization; and
using a measurement module, calculating the thickness of the coating based on the measured polarization difference and generating an output based on the calculated thickness.

10. The method of claim 9, further comprising displaying the calculated thickness using a display.

11. The method of claim 9, further comprising calculating the thickness based on data correlating measured polarizations differences to respective thicknesses.

12. The method of claim 11, further comprising executing a model that outputs the calculated thickness based on the measured polarization difference.

13. The method of claim 11, wherein the data includes a lookup table.

14. The method of claim 11, wherein the data includes a plurality of data points each correlating an actual measured thickness to measured ellipsometry data.

15. The method of claim 14, wherein the measured ellipsometry data includes at least one of a reflection ratio p, an amplitude ratio $\Psi$, and a phase shift $\Delta$.

16. The method claim 9, wherein the polymer coating is at least partially transparent to light.

* * * * *